(12) United States Patent
Cohen et al.

(10) Patent No.: US 10,817,567 B2
(45) Date of Patent: Oct. 27, 2020

(54) TECHNIQUES FOR INFORMATION GRAPH COMPRESSION

(71) Applicant: INTEL CORPORATION, Santa Clara, CA (US)

(72) Inventors: Ehud Cohen, Kiryat Motskin (IL); Adnan Agbaria, Haifa (IL)

(73) Assignee: INTEL CORPORATION, Santa Clara, CA (US)

( * ) Notice: Subject to any disclaimer, the term of this patent is extended or adjusted under 35 U.S.C. 154(b) by 294 days.

(21) Appl. No.: 15/941,168

(22) Filed: Mar. 30, 2018

(65) Prior Publication Data
US 2019/0042662 A1 Feb. 7, 2019

(51) Int. Cl.
| | |
|---|---|
| *G06F 16/00* | (2019.01) |
| *G06F 16/901* | (2019.01) |
| *G06N 5/02* | (2006.01) |
| *G06F 16/9038* | (2019.01) |
| *G06N 20/00* | (2019.01) |

(52) U.S. Cl.
CPC ...... *G06F 16/9024* (2019.01); *G06F 16/9038* (2019.01); *G06N 5/02* (2013.01); *G06N 20/00* (2019.01)

(58) Field of Classification Search
CPC .. G06F 16/9024; G06F 16/9038; G06F 16/00; G06F 17/30; G06F 17/30958; G06F 7/36; G06F 12/0806; G06F 12/0824; G06F 12/0893; G06F 12/1027; G06N 5/02; G06N 20/00; G06T 9/00; H04N 1/64; H04N 1/41; H04N 19/105
See application file for complete search history.

(56) References Cited

U.S. PATENT DOCUMENTS

| | | | |
|---|---|---|---|
| 2007/0208693 A1* | 9/2007 | Chang | G06F 16/20 |
| 2008/0174416 A1* | 7/2008 | Pala | G01D 11/28 340/461 |
| 2010/0306158 A1* | 12/2010 | Andersen | G06F 17/10 706/52 |
| 2014/0074893 A1* | 3/2014 | Griffin | H04L 67/22 707/798 |
| 2014/0280143 A1* | 9/2014 | Milenova | G06F 16/9024 707/737 |
| 2014/0286579 A1* | 9/2014 | Grujic | G06T 7/187 382/203 |
| 2016/0327583 A1* | 11/2016 | Pollack | G06K 7/10861 |
| 2017/0186425 A1* | 6/2017 | Dawes | G10L 15/222 |
| 2017/0272825 A1* | 9/2017 | Patel | H04N 21/4668 |
| 2019/0012406 A1* | 1/2019 | Li | G06F 7/36 |

\* cited by examiner

*Primary Examiner* — Anh Ly

(57) ABSTRACT

Techniques and apparatus for providing graph compression structures for graph information are described. In one embodiment, for example, an apparatus may include at least one memory, at least one processing circuitry, and logic, coupled to the at least one processing circuitry, to access graph information comprising a plurality of nodes, define a unique index for each of the plurality of nodes, determine whether each of the plurality of nodes has at least one neighbor node, and generate a graph compression structure comprising an entry for each of the plurality of nodes having at least one neighbor node and an adjacency list comprising an array of neighbor nodes of each entry.

25 Claims, 9 Drawing Sheets

```
                           405 upscan (int u, Marker m)
1:      FIFO Q = {u}
2:      while (Q ≠ ∅)
3:          int v = Q.front(); Q.pop()
4:          if (isMarkable(v, m))
5 :             mark(v, m)
6:              ∀w ∈ v.N, Q.push(w)
```

*FIG. 4*

TECHNIQUES FOR INFORMATION GRAPH COMPRESSION

TECHNICAL FIELD

Embodiments herein generally relate to information processing, and more particularly, to processing information of graph data structures.

BACKGROUND

Various processes, such as artificial intelligence (AI) applications, operate using complex data structures such as graphs, trees, and linked-lists. For example, many AI applications utilize multiple large graphs in order to store and process information. Conventional graph storage and access techniques experience severe performance degradation due to memory access overhead. For instance, complex data structures may be distributed among processor-level cache memory. Accessing an element, or node, from such complex data structures may involve performing multiple pointer-dereferences, typically referred to as "pointer chasing." More specifically, traveling from a node to its neighbors in a graph, requires random "chasing" of pointers in memory, which significantly reduces performance.

BRIEF DESCRIPTION OF THE DRAWINGS

FIG. 4 illustrates an embodiment of pseudocode for accessing data using a compression information structure.

DETAILED DESCRIPTION

Figure 1:
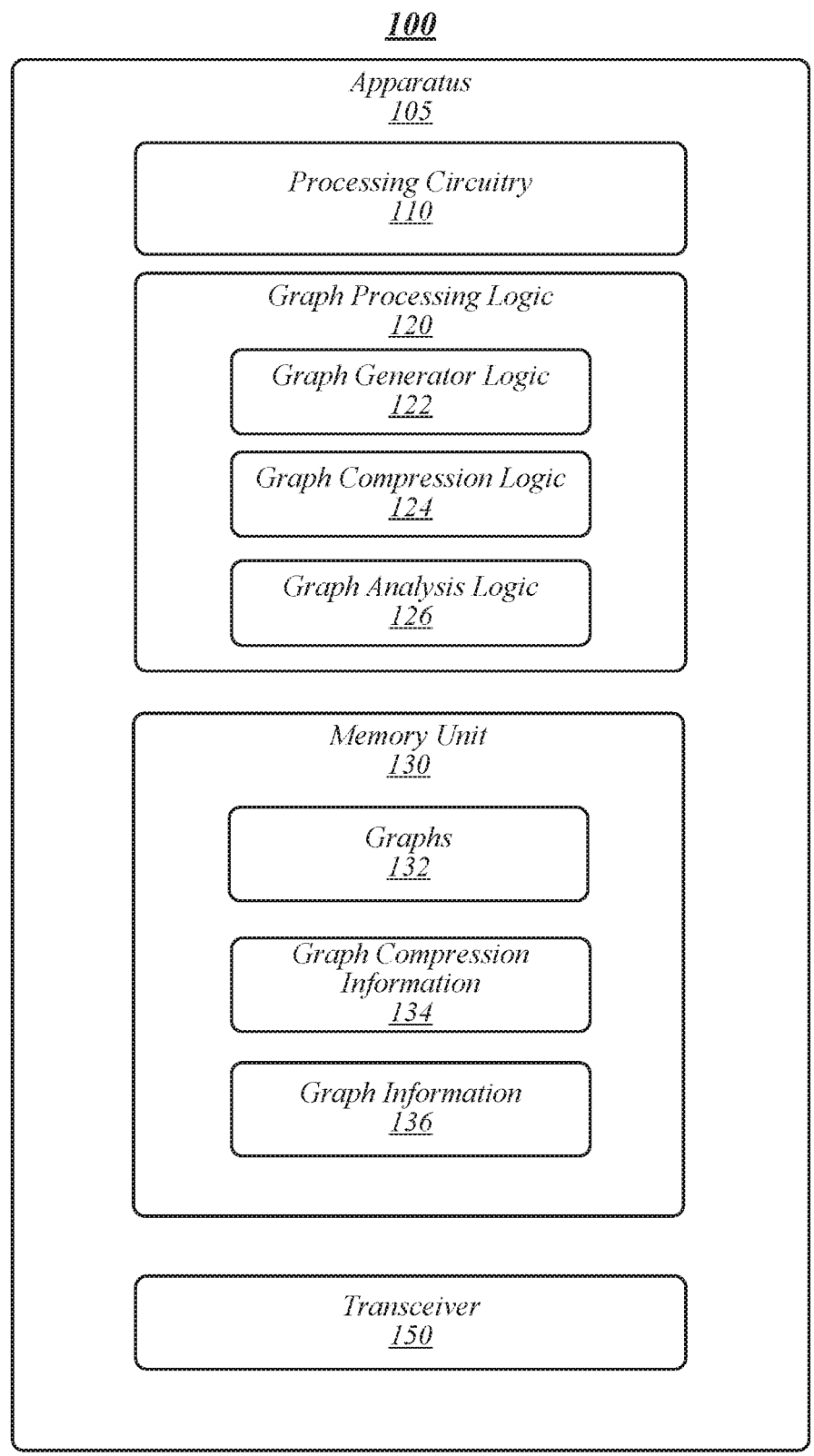
FIG. 1 illustrates an embodiment of a first operating environment.

Various embodiments may be generally directed to managing information for complex data structures. In some embodiments, the complex data structure may include an information graph. In various embodiments, a graph compression process may operate to generate a compression information structure representing information in an information graph, such as graph nodes, node neighbors, and/or the like. In some embodiments, the compression information structure may include an adjacency list for each graph node having at least one neighbor that includes a list of neighbor nodes for that graph node. In various embodiments, the information graph may be marked using a marking protocol. In such embodiments, only marked (or markable) nodes may be included as neighbor nodes in the adjacency list.

Pointer-chasing causes noticeable performance degradation for algorithms that traverse complex data structures, such as large graphs. Traveling from a node to its neighbors in a graph, requires random "chasing" of pointers in memory, significantly reducing performance. An illustrative protocol for reasoning on graphs, such as knowledge base (KB) or knowledge graphs is the Marker-Passing (MP) protocol, for example as described in Hendler, J. A., "Integrating Marker-Passing and Problem Solving: Spreading Activation Approach to Improved Choice in Planning," Lawrence Erlbaum Associates, N.J., 1987, and variations thereof. The MP protocol performs mainly a bi-direction search on a graph, such as a KB graph. Most of the execution time is spent on scanning the graph up and down. During the search, the MP algorithm visits various nodes randomly. Therefore, the main processing of the MP protocol is to chase nodes during analysis, such as while performing a search.

Conventional techniques for addressing pointer-chasing in graph data structures includes distributing graphs across a several machines to eliminate the presence of a large graph in a single machine such (for instance, Spark GraphX and GraphLab). Other conventional techniques involve the use of dedicated hardware acceleration, such as via accelerators using smart caching and multi-threading for parallelism. At least one disadvantage of distributing the graph on a cluster of machines is the communication and synchronization overhead required for distributed systems. In addition, such techniques are not applicable for client and edge systems, which only operate using a single device. Another disadvantage of distributing the graph on a cluster of machines is that it requires dedicated resources, such as hardware and/or software resources, that can be used only for these algorithms. Conventional techniques that are based on parallelism and smart caching introduce overhead of synchronization and still have the pointer-chasing. Although such techniques may achieve somewhat lower cache missing rates, they do not provide an increase in performance that justifies dedicated software and/or hardware.

The compressed representation of information is different that the compressed representation for sparse matrices according to conventional techniques (for instance, CSC and CSR). In CSC/CSR of sparse matrix, every node has a list of all the neighbors, represented either in row (CSR) or column (CSC). Processes according to some embodiments, among other things, only save the protocol-dependent neighbors of a node v. For example, in some embodiments, neighbors of node v that the marker (for example, of a PM protocol) can pass to them (but, not all the neighbors) may be saved. For every node, the protocol-dependent neighbors may be calculated during a pre-processing phase.

Accordingly, some embodiments may provide graph compression processes operative to provide compression and/or pre-processing of complex data structure information. For example, during pre-processing, protocol-dependent neighbors (for example, the MP protocol) for every node may be determined and stored in a compression information structure. Accordingly, a protocol (for example, the MP protocol) may operate with an efficient (for instance, compressed) version of the graph such that propagation from a node to its neighbors is faster and requires less resources (for instance, processing and/or memory resources) than for conventional techniques. For example, using techniques according to some embodiments, improved performance (such as a fifty-fold performance improvement) was achieved for the MP protocol (for instance, on Intel architecture (IA)) without the addition of hardware. In addition, graphs, data structures, and/or the like may be compressed according to some embodiments and require less storage space, including compared with the storage space requirements of conventional compression methods. For example, graph information of 3600 elements may require 542 KB of memory space. A conventional technique, such as Sparse Matrix may require 260 KB of memory space. However, a graph compression structure according to some embodiments may only require 100 KB. In another example, graph information having elements in the 10 million range may require 1.5 GB of memory space. Sparse Matrix may require 20 GB of memory space. However, a graph compression structure according to some embodiments may only require 0.2 GB. Furthermore, conventional graph information compression techniques do not address pointer-chasing. Accordingly, graph compression processes according to some embodiments provide a non-limiting technological advantage over conventional graph information compression techniques because graph compression processes according to some embodiments reduce or completely eliminate pointer-chasing. In this manner, graph compression processes according to some embodiments may allow for more efficient processing and storage of graph information, including very large graphs associated with artificial intelligence (AI) processes.

In this description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

In the following description, references to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Further, some embodiments may have some, all, or none of the features described for other embodiments.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner FIG. 1 illustrates an example of an operating environment 100 that may be representative of various embodiments. The operating environment 100 depicted in FIG. 1 may include an apparatus 105 having a processing circuitry 110, a graph processing logic 120, a memory unit 130, and a transceiver 150. Apparatus 105 may be or may include a computing device, such as a laptop computer, a personal computer (PC), a workstation computer, a tablet, a personal digital assistant (PDA), a smartphone, a phablet, an image capture device, a server, a networking device, and/or the like.

Processing circuitry 110 may be communicatively coupled to graph processing logic 120, memory unit 130, and/or transceiver 150. In various embodiments, processing circuitry 110 may include a central processing unit (CPU) and/or may be implemented on or as a system-on-a-chip (SoC). Processing circuitry 110 may include and/or may access various logic for performing processes according to some embodiments. For instance, processing circuitry 110 may include and/or may access graph processing logic 120, graph generator logic 122, graph compression logic 124, and/or graph analysis logic 126. Although FIG. 1 depicts graph generator logic 122, graph compression logic 124, and/or graph analysis logic 126 as part of graph processing logic 120, embodiments are not so limited, as graph generator logic 122, graph compression logic 124, and/or graph analysis logic 126 may be standalone logic and/or logic an element of other logic, applications, and/or the like.

Graph processing logic 120, graph generator logic 122, graph compression logic 124, and/or graph analysis logic 126, and/or logic, modules, controllers, and/or other elements thereof may be implemented in hardware, software, or a combination thereof. As used in this application, the terms "logic," "component," "layer," "system," "circuitry," "decoder," "encoder," and/or "module" are intended to refer to a computer-related entity, either hardware, a combination of hardware and software, software, or software in execution, examples of which are provided by the exemplary computing architecture 900. For example, a logic, circuitry, or a layer may be and/or may include, but are not limited to, a process running on a processor, a processor, a hard disk drive, multiple storage drives (of optical and/or magnetic storage medium), an object, an executable, a thread of execution, a program, a computer, hardware circuitry, integrated circuits, a controller, application specific integrated circuits (ASIC), programmable logic devices (PLD), digital signal processors (DSP), field programmable gate array (FPGA), a system-on-a-chip (SoC), memory units, logic gates, registers, semiconductor device, chips, microchips, chip sets, software components, programs, applications, firmware, software modules, computer code, combinations of any of the foregoing, and/or the like.

In some embodiments, logic 120, graph generator logic 122, graph compression logic 124, and/or graph analysis logic 126, and/or logic, modules, controllers, and/or other elements thereof may be arranged within processing circuitry 110; however, embodiments are not so limited. For example, logic 120, graph generator logic 122, graph compression logic 124, and/or graph analysis logic 126, and/or logic, modules, controllers, and/or other elements thereof may be located within an accelerator, a processor core, an interface, an individual processor die, a logic circuit, and/or the like and may include other components, such as software, firmware, circuitry and/or the like.

Memory unit 130 may include various types of computer-readable storage media and/or systems in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In addition, Memory unit 130 may include various types of computer-readable storage media in the form of one or more lower speed memory units, including an internal (or external) hard disk drive (HDD), a magnetic floppy disk drive (FDD), and an optical disk drive to read from or write to a removable optical disk (e.g., a CD-ROM or DVD), a solid state drive (SSD), and/or the like.

In some embodiments, graph processing logic 120 may operate to perform various processes relating to generating, providing, analyzing, compressing, or otherwise processing graphs 132, graph compression information 134, and/or graph information 136. Graph generator logic 122 may be operative to generate graphs 132. In some embodiments, graphs 132, graph compression information 134, and/or graph information may include and/or may be generated based on various types of information and/or computational models, including, without limitation, a machine-learning model, an artificial intelligence (AI) model, a neural network (NN), an artificial neural network (ANN), a convolutional neural networks (CNN), a deep learning (DL) network, a semantic network (SN), and/or the like. In some embodiments, graphs 132 may include knowledge base (KB) graphs or knowledge graphs, including KB graphs of computational models.

Graph analysis logic 126 may include various processes for analyzing information in graphs 132 and/or graph compression information 134, including, for instance, search or other operations. In some embodiments, graph analysis logic 126 may be operative to perform marker passing (MP) protocol on graphs 132 and/or graph compression information 134. In general, the MP protocol may perform a bi-directional search on graphs 132, such as a KB graph. For example, the MP protocol mainly has two operations for propagation on KB graphs: upscan and downscan. During upscan, the MP protocol propagates the graph from a child node towards parent nodes; during downscan the MP protocol propagates from a parent node toward child nodes. In some embodiments, graph analysis logic 126 may be operative to perform a markable-neighbors (MN) process on graph compression information 134. In various embodiments, a MN process may include performing MP protocol on graph compression information (for example, as opposed to performing the MP protocol on a conventional graph 132).

Graph compression logic 124 may be operative to perform various pre-processing and/or graph compression processes on graph information 136, portions thereof, source information thereof, and/or forms thereof. In general, graph information 136 may include information used to generate graphs 132 and/or graph compression information 134, including, without limitation, a computational model such as a semantic network (SN). However, in some embodiments, graph compression logic 134 may operate to generate graph compression information (see, for example, FIG. 3) from graph information 136. In some embodiments, a graph compression process may include a markable-neighbors (MN) process. In various embodiments, a MN process may include generating compression information structure based on an MP protocol of a graph 132 and/or graph information 136. For example, in some embodiments, markable neighbors of a node may be determined during a pre-processing phase of a graph 132 and/or graph information 136 operative to determine every node v in the graph 132 having a neighbor node that the node v can send a marker to. Nodes in a graph or that would be included in a graph, for example, having a neighbor node, may be represented in a compression information structure of graph compression information 134 along with an adjacency list indicating the immediate neighbors of each node.

Figure 2:
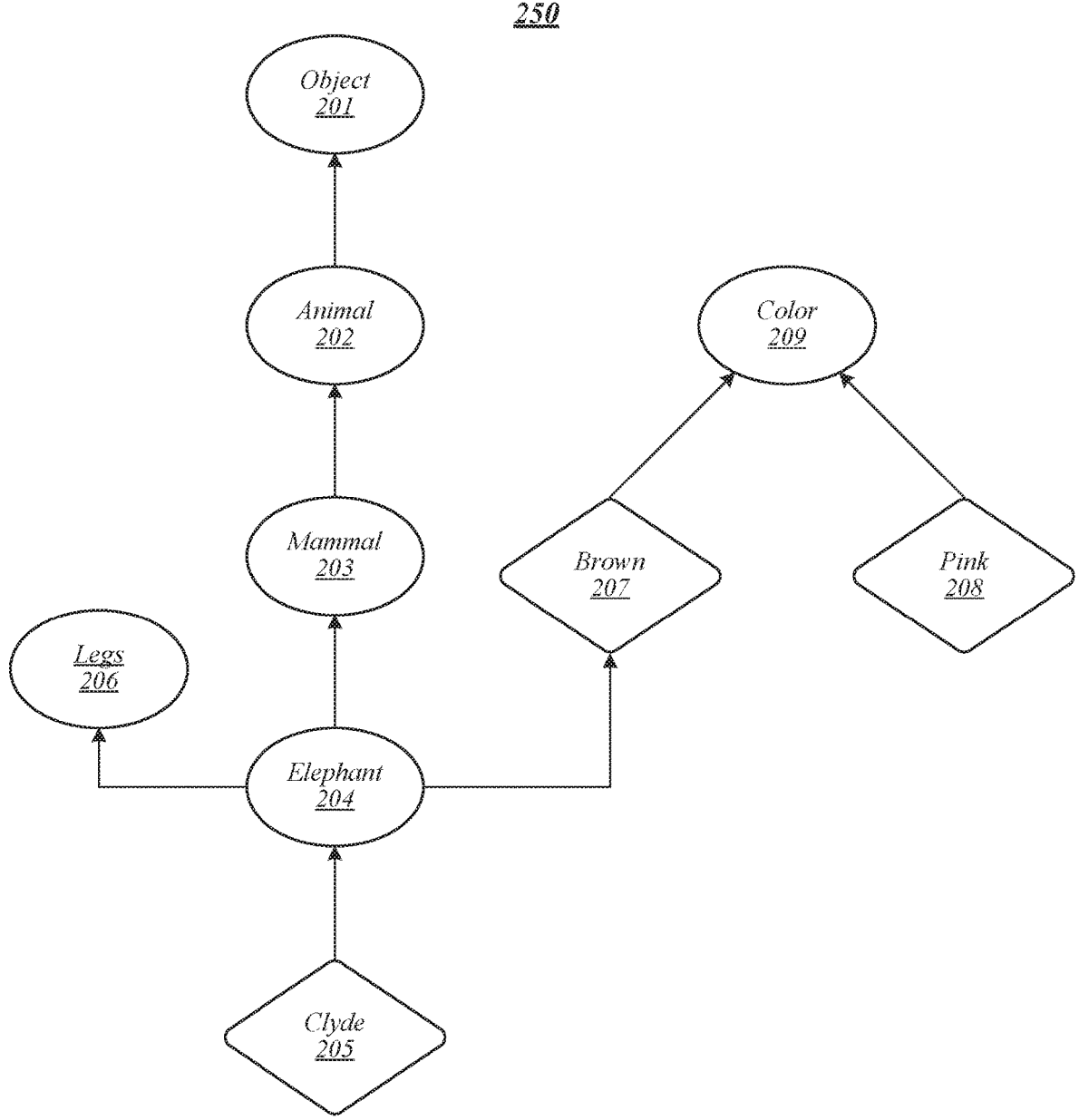
FIG. 2 illustrates an embodiment of a graph data structure.

FIG. 2 illustrates an embodiment of a graph data structure. As shown in FIG. 2, graph 250 may include various nodes. Certain nodes may be type nodes, such as nodes 201-204, 206, and 209. Certain nodes may be individual nodes, such as nodes 205, 207, and 208. Nodes 201-209 may be connected via various types of links, such as "is-a" links, "has-part" links, "instance-of" links, "color-of" links, and/or the like. For example, "is-a" links connect nodes 201 and 202, 202 and 203, 203 and 204. "Instance-of" links connect nodes 204 and 205, 207 and 209, and 208 and 209. Nodes 204 and 206 are connected via a "has-part" link and does 204 and 207 are connected via a "color-of" link. In some embodiments, graph 250 may be a KB graph of an SN. In addition, nodes and/or links may include further metadata that require storage, such as name, direction, and/or the like.

In exemplary embodiments, graph 250 may be marked using an MP protocol in one of a downscan or upscan process. In an upscan process, the MP protocol starts from a given node to mark with a marker. Then, the marker propagates upward, for example, through the parent and "is-a" links. For example, if the MP process starts the marker with node 205, then all the nodes (except node 209) may be marked. Accordingly, the MP process on graph 250 chases pointers while accessing nodes, for example, created in a random order.

Figure 3:
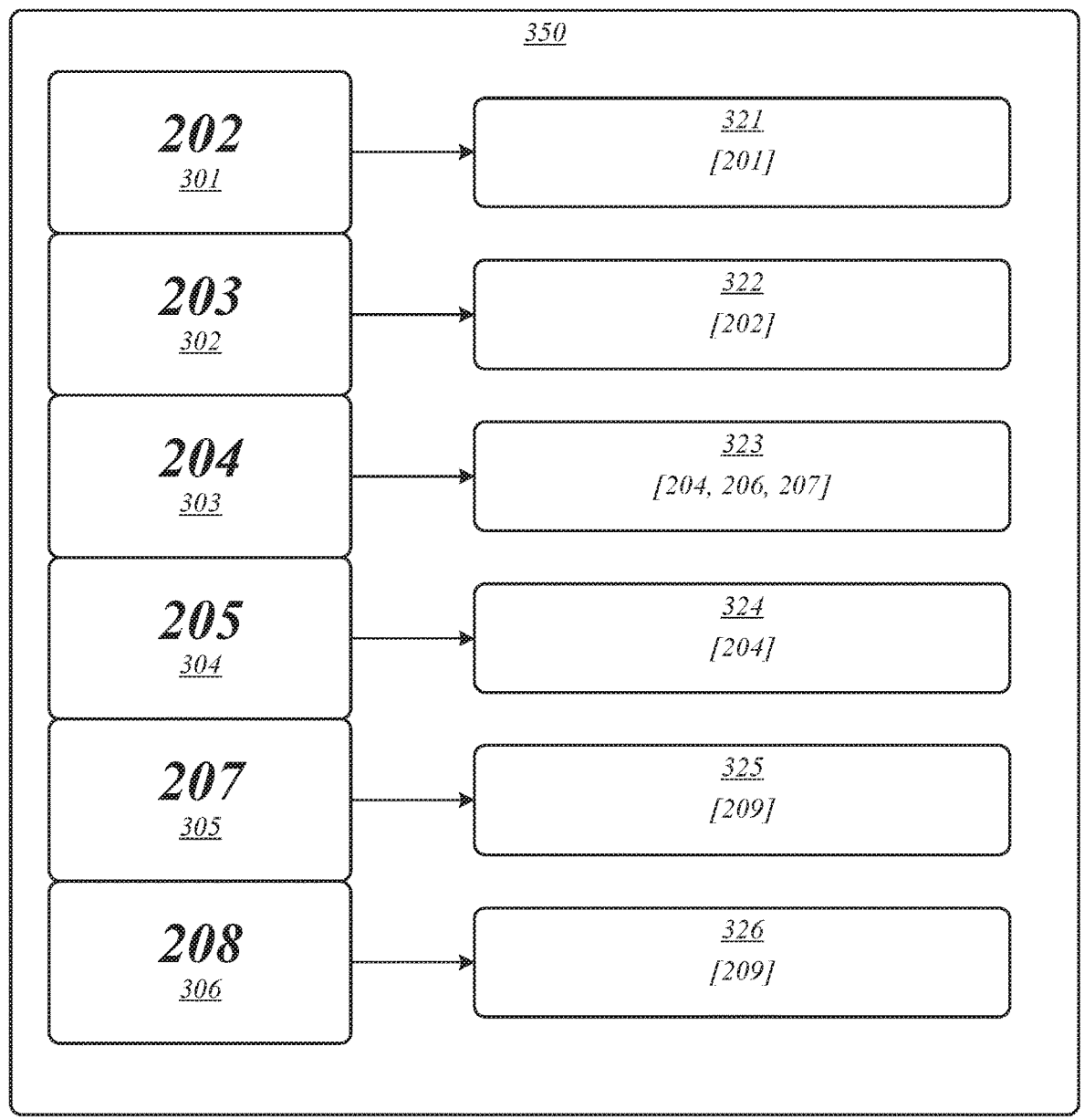
FIG. 3 illustrates an embodiment of a compression information structure.

FIG. 3 illustrates an embodiment of a compression information structure. As shown in FIG. 3, compression information structure 350 may include a data structure (such as a table or table-based data structure) operative to store nodes 301-306 and adjacency lists 321-326 associated with nodes 301-306. Compression information structure 350 may be a representation of graph information 136, such as an SN, generated by graph compression information. Accordingly, in some embodiments, compression information structure 350 may represent a compressed format for storing the same information stored as a KB graph, such as graph 250. In some embodiments, compression information structure 350 may provide the MN representation of graph 250.

For example, if an SN has N nodes, a graph compression process may map every node of SN to a unique index (for example, 201-209 relating to the SN used to generate graph 250) from $N_i=\{0, \ldots, N-1\}$ (or $\{201, \ldots, 209\}$ for the examples provided in FIGS. 2 and 3. Compression information structure 350 may include adjacency lists 321-326 such that compression information structure 350 may be or may include an array of indices from the group $N_i$. In some embodiments, pre-processing with a graph compression process may provide that, for every entry u, compression information structure 350 includes an adjacency list 321-326 of its neighbors. In some embodiments, adding a new node during runtime may involve adding a new entry to compression information structure 350. In addition, adding or removing an arch or link on the KB graph may initiate updating the neighbor list of a node of compression information structure 350.

FIG. 4 illustrates an embodiment of pseudocode for accessing data using a compression information structure. More specifically, FIG. 4 depicts pseudocode 405 for analyzing a compression data structure using an upscan operation on compression information structure 350 using the MP protocol (an upscan MP process). Although an upscan or upscan MP process is used as an example in FIG. 4, embodiments are not so limited. For example, embodiments may use a downscan process, non-MP processes, and/or any other process capable of operating according to some embodiments to analyze a compression information structure, graph information, and/or the like). As indicated by FIG. 4, with the compression information structure 350 representation of data, the MP protocol may work faster (for instance, no pointer-chasing) and may provide easier implementation. For example, instead of chasing the direct memory access of relevant neighbor nodes, such as the MP protocol on graph 250, each neighbor node 301-306 of compression information structure 350 may be accessed via an adjacency list 321-326 of indexes in the compression information structure (for example, line 6 of pseudocode 405). In addition, in some embodiments, only nodes that are markable (for example, line 4 of pseudocode 405) may be included in neighbor nodes 301-306, for example, based on criteria derived from the MP protocol.

The upscan MP process version operating using MP on a compression information structure according to some embodiments may include generating a data structure, such as a first-in-first-out (FIFO) queue or other FIFO data structure. In some embodiments, the FIFO data structure may include the nodes, elements, and/or adjacency lists of a compression information structure, such as compression information structure 350. For example, the FIFO data structure may include the entries (for instance, nodes 301-306 and the corresponding adjacency lists 321-326.) of compression information structure. The upscan MP process may proceed through the elements of the FIFO data structure. In various embodiments, the upscan MP process may obtain the top or front data element in the FIFO data structure, for instance, as entry or data element v (for example, node 202 of compression information structure 350). In some embodiments, the upscan MP process may remove or "pop" the front data element from the FIFO data structure. The upscan MP process may determine whether entry v is markable. If entry v is markable, every neighbor w of entry v (for instance, in the indices list of neighbors v.N of v, such as each node in an adjacency list 321-326 of a node 301-306) is added or "pushed" onto the FIFO data structure. For example, for node 303 of compression information structure 350, neighbors 204, 206, 207 of adjacency list 323 may be pushed onto the FIFO data structure.

As indicated in FIGS. 3 and 4, representation of graph information according to some embodiments may avoid pointer chasing and, therefore, reduce analysis (e.g., search) time of the MP protocol. In addition, compression information structures according to some embodiments may represent more information in the graph, allowing, for example, for larger graphs and/or more efficient storage of graphs.

Figure 5:
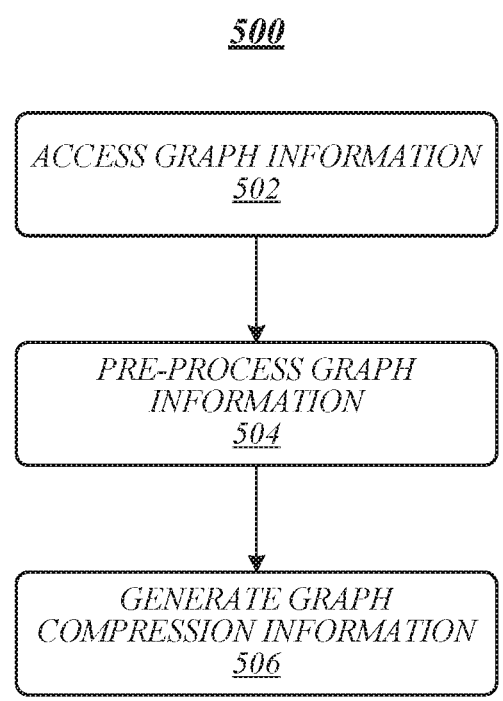
FIG. 5 illustrates an embodiment of a first logic flow.

FIG. 5 illustrates an embodiment of a logic flow 500. Logic flow 500 may be representative of some or all of the operations executed by one or more embodiments described herein, such as apparatus 105. At block 502, graph information may be accessed. For example, graph processing logic 120 may access graph 132 and/or graph information 136. In some embodiments, graph compression logic 124 may access graph information 136, such as an SN. Logic flow 500 may pre-process graph information at block 504. For example, graph compression logic 124 may perform a graph compression process may map every node of SN to a unique index, determine which nodes have markable neighbors, and determine an adjacency list for every node having a markable neighbor. At block 506, logic flow 500 may generate graph compression information. For example, graph compression logic 124 may generate graph compression information 350 for the SN.

Figure 6:
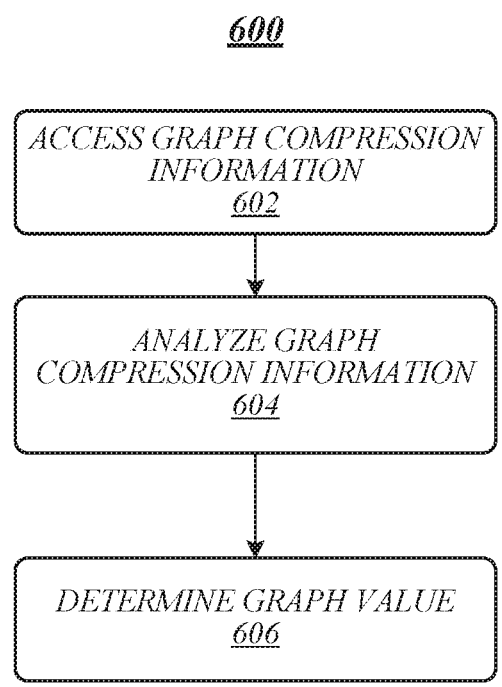
FIG. 6 illustrates an embodiment of a second logic flow.

FIG. 6 illustrates an embodiment of a logic flow 600. Logic flow 600 may be representative of some or all of the operations executed by one or more embodiments described herein, such as apparatus 105. At block 602, logic flow 600 may access graph compression information. For example, graph analysis logic 126 may access graph compression information 134, such as graph compression structure 350. Logic flow 600 may analyze graph compression information at block 604. For example, graph analysis logic 126 may perform a search using the upscan MP protocol on graph compression structure 350, such according to pseudocode 405. At block 406, logic flow 600 may determine graph value. For example, graph analysis logic 126 via pseudocode 405 may determine a value associated with a search that is the subject of the analysis.

Figure 7:
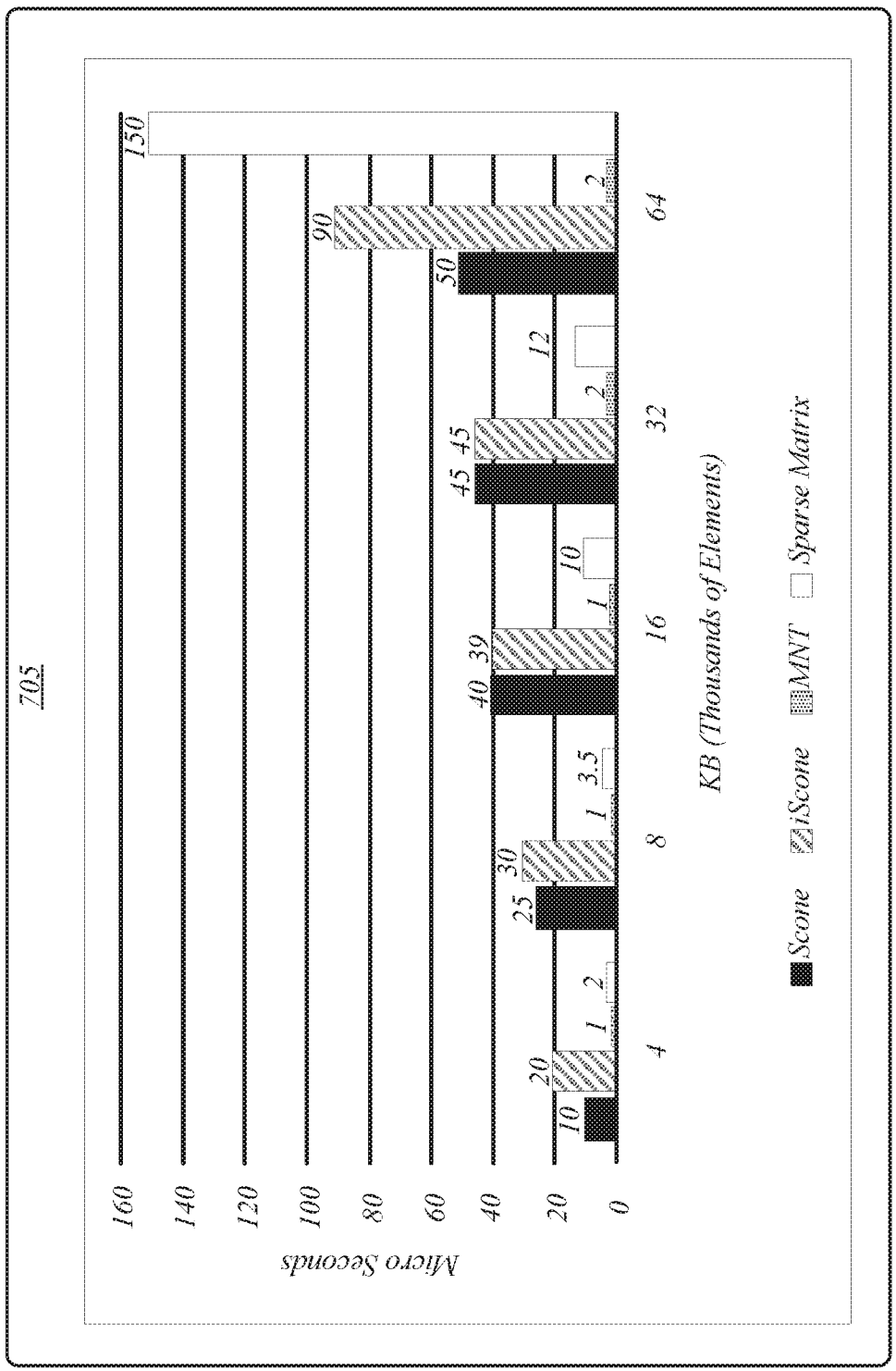
FIG. 7 illustrates experiment data.

MP Protocol Performance Experiment:

An experiment was conducted executing the MP protocol on various implementations of KB graphs. The implementations included the following: Scone (Carnegie Mellon University implementation of the MP protocol); iScone (naïve implementation of MP protocol in which the upscan/downscan are implemented using graph traversal); Markeable Neighbors Table (MNT) (implementation according to some embodiments, for example, with graph compression and pre-processing of KB graph); and Sparse Matrix (sparse matrix implementation of MP protocol). FIG. 7 depicts the results of the MP Protocol Performance Experiment.

In the MP Protocol Performance Experiment, the MP protocol was executed with different size of KB (for instance, x-axis of graph 705), where the numbers are in thousands of elements (an element is either a node or link in the KB). The time is reported in micro seconds ($\mu s$) and was calculated as the average of 100 calls of upscan. As indicated in FIG. 7, MNT has the best performance of 2 $\mu s$ with 64 thousands nodes of KB (i.e., lower values indicate better performance). In contrast, Scone and iScone have 50 $\mu s$ and 90 $\mu s$, respectively. Accordingly, MNT provides a dramatic improvement over conventional solutions.

Figure 8:
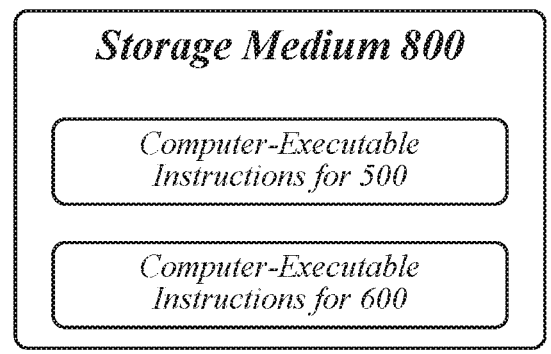
FIG. 8 illustrates an example of a storage medium.

FIG. 8 illustrates an example of a storage medium 800. Storage medium 800 may comprise an article of manufacture. In some examples, storage medium 800 may include any non-transitory computer readable medium or machine readable medium, such as an optical, magnetic or semiconductor storage. Storage medium 800 may store various types of computer executable instructions, such as instructions to implement logic flow 500 and/or 600. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 9:
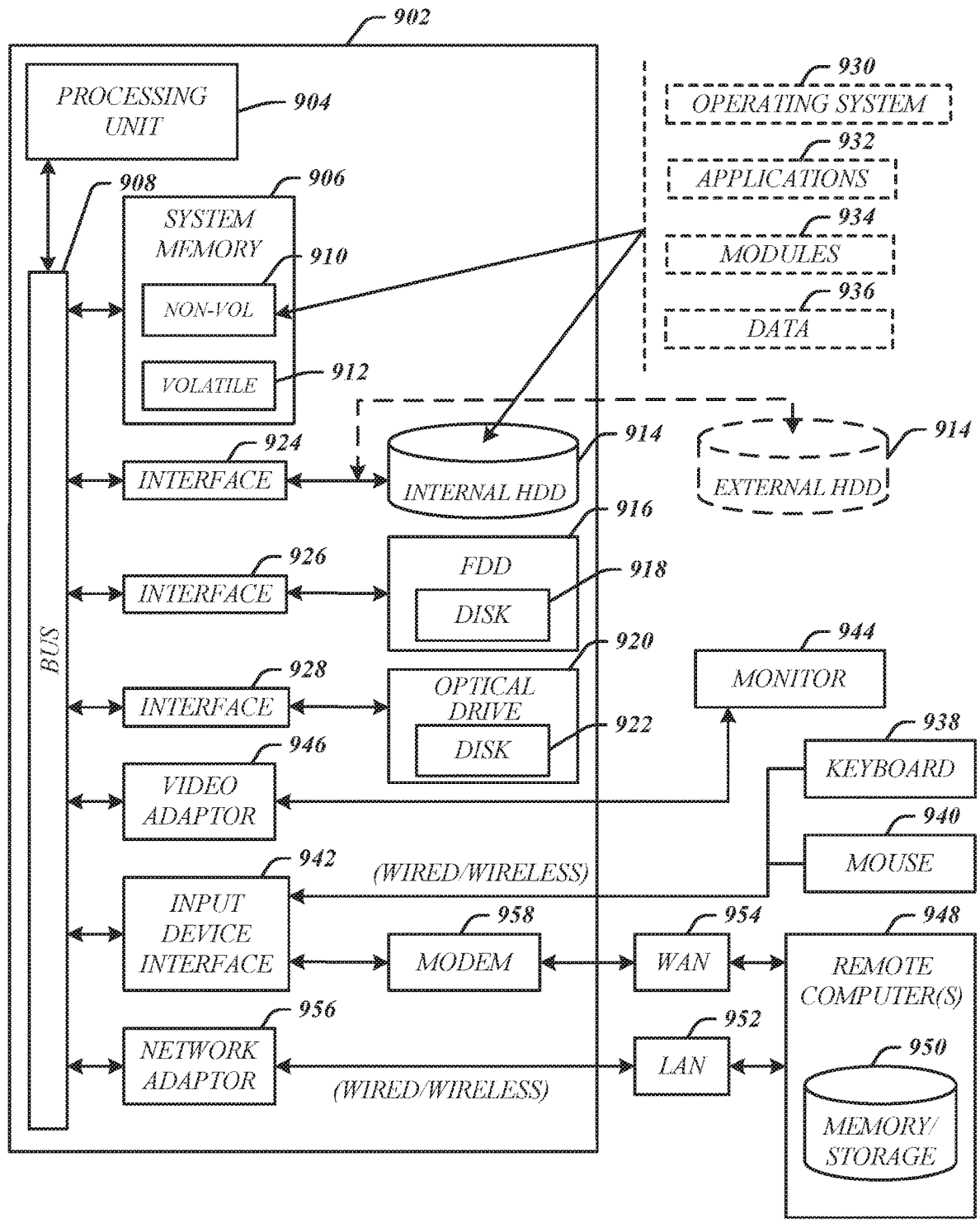
FIG. 9 illustrates an embodiment of a computing architecture.

FIG. 9 illustrates an embodiment of an exemplary computing architecture 900 suitable for implementing various embodiments as previously described. In various embodiments, the computing architecture 900 may comprise or be implemented as part of an electronic device. In some embodiments, the computing architecture 900 may be representative, for example, of apparatus 105. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1384 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of apparatus 105.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1384 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956.

The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following include non-limiting example embodiments:

Example 1 is an apparatus, comprising at least one memory, at least one processing circuitry, and logic, coupled to the at least one processing circuitry, to access graph information comprising a plurality of nodes, define a unique index for each of the plurality of nodes, determine whether each of the plurality of nodes has at least one neighbor node, and generate a graph compression structure comprising an entry for each of the plurality of nodes having at least one neighbor node and an adjacency list comprising an array of neighbor nodes of each entry.

Example 2 is the apparatus of Example 1, wherein the graph information comprises a semantic network.

Example 3 is the apparatus of Example 1, wherein the graph information comprises a knowledge base (KB) graph of a semantic network.

Example 4 is the apparatus of Example 1, wherein the at least one neighbor node comprises at least one markable neighbor of a marker-passing (MP) protocol.

Example 5 is the apparatus of Example 1, wherein the entry comprises a node in a graph having at least one neighbor node that the node can send a marker of a marker-passing (MP) protocol.

Example 6 is the apparatus of Example 1, the logic to perform analysis of the graph compression structure without pointer-chasing.

Example 7 is the apparatus of Example 1, the logic to access each neighbor node of the entry via the adjacency list.

Example 8 is the apparatus of Example 1, the logic to analyze the graph compression structure using a marker-passing (MP) protocol.

Example 9 is the apparatus of Example 1, the logic to generate the graph compression structure by mapping each of the plurality of nodes to the unique index and generating the adjacency lists for each of the plurality of nodes having a markable neighbor.

Example 10 is the apparatus of Example 1, wherein the graph information comprises N nodes, the logic to generate the graph compression structure by mapping each of the N nodes to the unique index to form group Ni={0, . . . , N−1} and generating the adjacency lists for each node in Ni having a markable neighbor according to a marker-passing (MP) protocol.

Example 11 is the apparatus of Example 1, the logic to analyze the graph compression structure using an upscan process according to the following pseudocode:

```
upscan (int u, Marker m)
    FIFO Q = {u}
    while (Q ≠ 0)
        int v = Q.front( ), Q.pop( )
        if (isMarkable(v, m))
            mark(v, m)
            ∀w ∈ v.N, Q.push(w).
```

Example 12 is a system, comprising the apparatus according to any of Examples 1-11, and at least one network interface.

Example 13 is a method, comprising accessing graph information comprising a plurality of nodes, defining a unique index for each of the plurality of nodes, determining whether each of the plurality of nodes has at least one neighbor node, and generating a graph compression structure comprising an entry for each of the plurality of nodes having at least one neighbor node and an adjacency list comprising an array of neighbor nodes of each entry.

Example 14 is the method of Example 13, wherein the graph information comprises a semantic network.

Example 15 is the method of Example 13, wherein the graph information comprises a knowledge base (KB) graph of a semantic network.

Example 16 is the method of Example 13, wherein the at least one neighbor node comprises at least one markable neighbor of a marker-passing (MP) protocol.

Example 17 is the method of Example 13, wherein the entry comprises a node in a graph having at least one neighbor node that the node can send a marker of a marker-passing (MP) protocol.

Example 18 is the method of Example 13, further comprising performing analysis of the graph compression structure without pointer-chasing.

Example 19 is the method of Example 13, further comprising accessing each neighbor node of the entry via the adjacency list.

Example 20 is the method of Example 13, further comprising analyzing the graph compression structure using a marker-passing (MP) protocol.

Example 21 is the method of Example 13, further comprising generating the graph compression structure by mapping each of the plurality of nodes to the unique index and generating the adjacency lists for each of the plurality of nodes having a markable neighbor.

Example 22 is the method of Example 13, wherein the graph information comprises N nodes, further comprising generating the graph compression structure by mapping each of the N nodes to the unique index to form group Ni= $\{0, \ldots, N-1\}$ and generating the adjacency lists for each node in Ni having a markable neighbor according to a marker-passing (MP) protocol.

Example 23 is the method of Example 13, further comprising analyzing the graph compression structure using an upscan process according to the following pseudocode:

```
upscan (int u, Marker m)
    FIFO Q = {u}
    while (Q ≠ 0)
        int v = Q.front( ), Q.pop( )
        if (isMarkable(v, m))
            mark(v, m)
            ∀w ∈ v.N, Q.push(w).
```

Example 24 is a non-transitory computer-readable storage medium that stores computer-executable instructions for execution by processing circuitry of a computing device, the computer-executable instructions, when executed, to cause the computing device to access graph information comprising a plurality of nodes, define a unique index for each of the plurality of nodes, determine whether each of the plurality of nodes has at least one neighbor node, and generate a graph compression structure comprising an entry for each of the plurality of nodes having at least one neighbor node and an adjacency list comprising an array of neighbor nodes of each entry.

Example 25 is the non-transitory computer-readable storage medium of Example 24, wherein the graph information comprises a semantic network.

Example 26 is the non-transitory computer-readable storage medium of Example 24, wherein the graph information comprises a knowledge base (KB) graph of a semantic network.

Example 27 is the non-transitory computer-readable storage medium of Example 24, wherein the at least one neighbor node comprises at least one markable neighbor of a marker-passing (MP) protocol.

Example 28 is the non-transitory computer-readable storage medium of Example 24, wherein the entry comprises a node in a graph having at least one neighbor node that the node can send a marker of a marker-passing (MP) protocol.

Example 29 is the non-transitory computer-readable storage medium of Example 24, the computer-executable instructions, when executed, to cause the computing device to perform analysis of the graph compression structure without pointer-chasing.

Example 30 is the non-transitory computer-readable storage medium of Example 24, the computer-executable instructions, when executed, to cause the computing device to access each neighbor node of the entry via the adjacency list.

Example 31 is the non-transitory computer-readable storage medium of Example 24, the computer-executable instructions, when executed, to cause the computing device to analyze the graph compression structure using a marker-passing (MP) protocol.

Example 32 is the non-transitory computer-readable storage medium of Example 24, the computer-executable instructions, when executed, to cause the computing device to generate the graph compression structure by mapping each of the plurality of nodes to the unique index and generating the adjacency lists for each of the plurality of nodes having a markable neighbor.

Example 33 is the non-transitory computer-readable storage medium of Example 24, wherein the graph information comprises N nodes, the computer-executable instructions, when executed, to cause the computing device to generate the graph compression structure by mapping each of the N nodes to the unique index to form group Ni=$\{0, \ldots, N-1\}$ and generating the adjacency lists for each node in Ni having a markable neighbor according to a marker-passing (MP) protocol.

Example 34 is the non-transitory computer-readable storage medium of Example 24, the computer-executable instructions, when executed, to cause the computing device to analyze the graph compression structure using an upscan process according to the following pseudocode:

```
upscan (int u, Marker m)
    FIFO Q = {u}
    while (Q ≠ 0)
        int v = Q.front( ), Q.pop( )
        if (isMarkable(v, m))
            mark(v, m)
            ∀w ∈ v.N, Q.push(w).
```

Example 35 is an apparatus, comprising a graph information means to access graph information comprising a plurality of nodes, and a graph compression means to define a unique index for each of the plurality of nodes, determine whether each of the plurality of nodes has at least one neighbor node, and generate a graph compression structure comprising an entry for each of the plurality of nodes having at least one neighbor node and an adjacency list comprising an array of neighbor nodes of each entry.

Example 36 is the apparatus of Example 35, wherein the graph information comprises a semantic network.

Example 37 is the apparatus of Example 35, wherein the graph information comprises a knowledge base (KB) graph of a semantic network.

Example 38 is the apparatus of Example 35, wherein the at least one neighbor node comprises at least one markable neighbor of a marker-passing (MP) protocol.

Example 39 is the apparatus of Example 35, wherein the entry comprises a node in a graph having at least one neighbor node that the node can send a marker of a marker-passing (MP) protocol.

Example 40 is the apparatus of Example 35, the graph compression means to perform analysis of the graph compression structure without pointer-chasing.

Example 41 is the apparatus of Example 35, the graph compression means to access each neighbor node of the entry via the adjacency list.

Example 42 is the apparatus of Example 35, the graph compression means to analyze the graph compression structure using a marker-passing (MP) protocol.

Example 43 is the apparatus of Example 35, the graph compression means to generate the graph compression structure by mapping each of the plurality of nodes to the unique index and generating the adjacency lists for each of the plurality of nodes having a markable neighbor.

Example 44 is the apparatus of Example 35, wherein the graph information comprises N nodes, the graph compression means to generate the graph compression structure by mapping each of the N nodes to the unique index to form group $Ni=\{0, \ldots, N-1\}$ and generating the adjacency lists for each node in Ni having a markable neighbor according to a marker-passing (MP) protocol.

Example 45 is the apparatus of Example 35, the graph compression means to analyze the graph compression structure using an upscan process according to the following pseudocode

```
upscan (int u, Marker m)
    FIFO Q = {u}
    while (Q ≠ 0)
        int v = Q.front( ), Q.pop( )
        if (isMarkable(v, m))
            mark(v, m)
            ∀w ∈ v.N, Q.push(w).
```

Example 46 is a system, comprising the apparatus according to any of Examples 35-45, and at least one network interface.

Example 47 is an apparatus, comprising at least one memory, at least one processing circuitry, and logic, coupled to the at least one processing circuitry, to analyze a graph compression structure generated based on graph information, the graph compression structure comprising an entry for each of a plurality of nodes having at least one neighbor node and an adjacency list comprising an array of neighbor nodes of each entry.

Example 48 is the apparatus of Example 47, the logic to analyze the graph compression structure to perform a search of the graph information.

Example 49 is the apparatus of Example 47, the logic to analyze the graph compression structure to perform a search of the graph information to generate a search result.

Example 50 is the apparatus of Example 47, the logic to analyze the graph information via performing an upscan marker-passing (MP) process on the graph compression structure.

Example 51 is the apparatus of Example 47, the logic to analyze the graph information via performing a downscan marker-passing (MP) process on the graph compression structure.

Example 52 is the apparatus of Example 47, the logic to analyze the graph information via performing an upscan marker-passing (MP) process on the graph compression structure, the logic to perform the upscan marker-passing (MP) process to generate a first-in-first-out (FIFO) data structure comprising markable nodes of the graph compression structure and each neighbor of the markable nodes.

Example 53 is the apparatus of Example 47, the logic to analyze the graph information via performing an upscan marker-passing (MP) process on the graph compression structure, the logic to perform the upscan marker-passing (MP) process to:
generate a first-in-first-out (FIFO) data structure comprising markable nodes of the graph compression structure and each neighbor of the markable nodes,
while the FIFO data structure is not empty:
    set data element v to the front data element of the FIFO data structure,
    remove the front data element from the FIFO data structure,
    determine whether data element v is markable,
    if data element v is markable, push every neighbor of data element v onto the FIFO data structure.

Example 54 is a method, comprising analyzing a graph compression structure generated based on graph information, the graph compression structure comprising an entry for each of a plurality of nodes having at least one neighbor node and an adjacency list comprising an array of neighbor nodes of each entry.

Example 55 is the method of Example 54, comprising analyzing the graph compression structure to perform a search of the graph information.

Example 56 is the method of Example 54, comprising analyzing the graph compression structure to perform a search of the graph information to generate a search result.

Example 57 is the method of Example 54, comprising analyzing the graph information via performing an upscan marker-passing (MP) process on the graph compression structure.

Example 58 is the method of Example 54, comprising analyzing the graph information via performing a downscan marker-passing (MP) process on the graph compression structure.

Example 59 is the method of Example 54, comprising analyzing the graph information via performing an upscan marker-passing (MP) process on the graph compression structure, the upscan marker-passing (MP) process to generate a first-in-first-out (FIFO) data structure comprising markable nodes of the graph compression structure and each neighbor of the markable nodes.

Example 60 is the method of Example 54, comprising analyzing the graph information via performing an upscan marker-passing (MP) process on the graph compression structure, the upscan marker-passing (MP) process to:
generate a first-in-first-out (FIFO) data structure comprising markable nodes of the graph compression structure and each neighbor of the markable nodes,
while the FIFO data structure is not empty:
    set data element v to the front data element of the FIFO data structure,
    remove the front data element from the FIFO data structure,
    determine whether data element v is markable,
    if data element v is markable, push every neighbor of data element v onto the FIFO data structure.

Example 61 is a non-transitory computer-readable storage medium that stores computer-executable instructions for execution by processing circuitry of a computing device, the computer-executable instructions, when executed, to cause the computing device to analyze a graph compression structure generated based on graph information, the graph compression structure comprising an entry for each of a plurality of nodes having at least one neighbor node and an adjacency list comprising an array of neighbor nodes of each entry.

Example 62 is the non-transitory computer-readable storage medium of Example 61, the computer-executable instructions, when executed, to cause the computing device to analyze the graph compression structure to perform a search of the graph information.

Example 63 is the non-transitory computer-readable storage medium of Example 61, the computer-executable instructions, when executed, to cause the computing device to analyze the graph compression structure to perform a search of the graph information to generate a search result.

Example 64 is the non-transitory computer-readable storage medium of Example 61, the computer-executable instructions, when executed, to cause the computing device to analyze the graph information via performing an upscan marker-passing (MP) process on the graph compression structure.

Example 65 is the non-transitory computer-readable storage medium of Example 61, the computer-executable instructions, when executed, to cause the computing device to analyze the graph information via performing a downscan marker-passing (MP) process on the graph compression structure.

Example 66 is the non-transitory computer-readable storage medium of Example 61, the computer-executable instructions, when executed, to cause the computing device to analyze the graph information via performing an upscan marker-passing (MP) process on the graph compression structure, the upscan marker-passing (MP) process to generate a first-in-first-out (FIFO) data structure comprising markable nodes of the graph compression structure and each neighbor of the markable nodes.

Example 67 is the non-transitory computer-readable storage medium of Example 61, the computer-executable instructions, when executed, to cause the computing device to analyze the graph information via performing an upscan marker-passing (MP) process on the graph compression structure, the upscan marker-passing (MP) process to:
generate a first-in-first-out (FIFO) data structure comprising markable nodes of the graph compression structure and each neighbor of the markable nodes,
while the FIFO data structure is not empty:
set data element v to the front data element of the FIFO data structure,
remove the front data element from the FIFO data structure,
determine whether data element v is markable,
if data element v is markable, push every neighbor of data element v onto the FIFO data structure.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. An apparatus, comprising:
at least one memory;
at least one processing circuitry; and
logic, coupled to the at least one processing circuitry, to:
access graph information comprising a plurality of nodes,
define a unique index for each of the plurality of nodes,
determine whether each of the plurality of nodes has at least one neighbor node, and
generate a graph compression structure comprising an entry for each of the plurality of nodes having at least one neighbor node and an adjacency list comprising an array of neighbor nodes of each entry, the graph compression structure to use less space in memory than the graph information.

2. The apparatus of claim 1, wherein the graph information comprises a semantic network.

3. The apparatus of claim 1, wherein the at least one neighbor node comprises at least one markable neighbor of a marker-passing (MP) protocol.

4. The apparatus of claim 1, wherein the entry comprises a node in a graph having at least one neighbor node that the node can send a marker of a marker-passing (MP) protocol.

5. The apparatus of claim 1, the logic to perform analysis of the graph compression structure without pointer-chasing.

6. The apparatus of claim 1, the logic to access each neighbor node of the entry via the adjacency list.

7. The apparatus of claim 1, the logic to analyze the graph compression structure using a marker-passing (MP) protocol.

8. The apparatus of claim 1, the logic to generate the graph compression structure by mapping each of the plurality of nodes to the unique index and generating the adjacency lists for each of the plurality of nodes having a markable neighbor.

9. The apparatus of claim 1, the logic to analyze the graph information via performing an upscan marker-passing (MP) process on the graph compression structure.

10. The apparatus of claim 1, the logic to analyze the graph information via performing an upscan marker-passing (MP) process on the graph compression structure, the logic to perform the upscan marker-passing (MP) process to generate a first-in-first-out (FIFO) data structure comprising markable nodes of the graph compression structure and each neighbor of the markable nodes.

11. A method, comprising:
accessing graph information comprising a plurality of nodes,
defining a unique index for each of the plurality of nodes,
determining whether each of the plurality of nodes has at least one neighbor node, and
generating a graph compression structure comprising an entry for each of the plurality of nodes having at least one neighbor node and an adjacency list comprising an array of neighbor nodes of each entry, the graph compression structure to use less space in memory than the graph information.

12. The method of claim 11, wherein the graph information comprises a semantic network.

13. The method of claim 11, wherein the at least one neighbor node comprises at least one markable neighbor of a marker-passing (MP) protocol.

14. The method of claim 11, wherein the entry comprises a node in a graph having at least one neighbor node that the node can send a marker of a marker-passing (MP) protocol.

15. The method of claim 11, further comprising performing analysis of the graph compression structure without pointer-chasing.

16. The method of claim 11, further comprising accessing each neighbor node of the entry via the adjacency list.

17. The method of claim 11, further comprising analyzing the graph compression structure using a marker-passing (MP) protocol.

18. The method of claim 11, further comprising generating the graph compression structure by mapping each of the plurality of nodes to the unique index and generating the adjacency lists for each of the plurality of nodes having a markable neighbor.

19. The method of claim 11, comprising analyzing the graph information via performing an upscan marker-passing (MP) process on the graph compression structure.

20. The method of claim 11, comprising analyzing the graph information via performing an upscan marker-passing (MP) process on the graph compression structure, the upscan marker-passing (MP) process to generate a first-in-first-out (FIFO) data structure comprising markable nodes of the graph compression structure and each neighbor of the markable nodes.

21. A non-transitory computer-readable storage medium that stores computer-executable instructions for execution by processing circuitry of a computing device, the computer-executable instructions, when executed, to cause the computing device to:
access graph information comprising a plurality of nodes;
define a unique index for each of the plurality of nodes;
determine whether each of the plurality of nodes has at least one neighbor node; and
generate a graph compression structure comprising an entry for each of the plurality of nodes having at least one neighbor node and an adjacency list comprising an array of neighbor nodes of each entry, the graph compression structure to use less space in memory than the graph information.

22. The non-transitory computer-readable storage medium of claim 21, wherein the graph information comprises a semantic network.

23. The non-transitory computer-readable storage medium of claim 21, wherein the graph information comprises a knowledge base (KB) graph of a semantic network.

24. The non-transitory computer-readable storage medium of claim 21, wherein the at least one neighbor node comprises at least one markable neighbor of a marker-passing (MP) protocol.

25. The non-transitory computer-readable storage medium of claim 21, wherein the entry comprises a node in a graph having at least one neighbor node that the node can send a marker of a marker-passing (MP) protocol.

\* \* \* \* \*